(12) United States Patent
Lambrecht

(10) Patent No.: US 7,190,699 B2
(45) Date of Patent: Mar. 13, 2007

(54) METHOD AND APPARATUS FOR IMPLEMENTING MULTIPLE CREDIT LEVELS OVER MULTIPLE QUEUES

(75) Inventor: Lonny Lambrecht, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 10/160,707

(22) Filed: May 31, 2002

(65) Prior Publication Data

US 2003/0223444 A1 Dec. 4, 2003

(51) Int. Cl.
*H04L 12/28* (2006.01)
(52) U.S. Cl. .................................. 370/412; 370/230
(58) Field of Classification Search ............... 370/230, 370/230.1, 235, 252, 412, 465
See application file for complete search history.

(56) References Cited

U.S. PATENT DOCUMENTS

| 4,530,033 | A | | 7/1985 | Meggs |
|---|---|---|---|---|
| 5,006,982 | A | | 4/1991 | Ebersole et al. |
| 5,063,562 | A | | 11/1991 | Barzilai et al. |
| 5,432,824 | A | | 7/1995 | Zheng et al. |
| 5,483,526 | A | | 1/1996 | Ben-Nun et al. |
| 5,515,359 | A | | 5/1996 | Zheng |
| 5,528,591 | A | | 6/1996 | Lauer |
| 5,572,522 | A | | 11/1996 | Calamvokis et al. |
| 5,592,476 | A | | 1/1997 | Calamvokis et al. |
| 5,629,936 | A | | 5/1997 | Lee et al. |
| 5,633,867 | A | | 5/1997 | Ben-Nun et al. |
| 5,825,748 | A | * | 10/1998 | Barkey et al. ............... 370/236 |
| 5,852,602 | A | * | 12/1998 | Sugawara ................. 370/235.1 |
| 5,999,518 | A | | 12/1999 | Nattkemper et al. |
| 6,044,406 | A | | 3/2000 | Barkey et al. |
| 6,052,375 | A | * | 4/2000 | Bass et al. ................... 370/412 |
| 6,594,234 | B1 | * | 7/2003 | Chard et al. ................ 370/236 |
| 6,683,884 | B1 | * | 1/2004 | Howard ....................... 370/412 |
| 7,023,857 | B1 | * | 4/2006 | Chiussi et al. ........... 370/395.4 |
| 2003/0112817 | A1 | * | 6/2003 | Woo et al. ................... 370/413 |

\* cited by examiner

*Primary Examiner*—Huy D. Vu
*Assistant Examiner*—Christine Ng
(74) *Attorney, Agent, or Firm*—Joan Pennington (57) ABSTRACT

A method, apparatus and computer program product implement multiple credit levels generated over multiple queues for a dataflow. A plurality of programmable configuration values is stored for each of the multiple queues including a queue maximum count, a queue clip count and a queue cutoff count. Buffer use and a number of outstanding credits to the dataflow for each of the multiple queues are monitored to maintain a current in use count. The current in use count is compared with a programmable global threshold count and the queue cutoff counts of the multiple queues. A number of credits are selectively generated for each of the multiple queues based upon the compared counts and the stored programmable configuration values.

17 Claims, 6 Drawing Sheets

METHOD AND APPARATUS FOR IMPLEMENTING MULTIPLE CREDIT LEVELS OVER MULTIPLE QUEUES

FIELD OF THE INVENTION

The present invention relates generally to the data processing field, nd more particularly, relates to a method, apparatus and computer program product for implementing multiple credit levels generated over multiple queues for a dataflow in storage and data networks.

DESCRIPTION OF THE RELATED ART

Storage and data networks are designed to support the integration of high quality voice, video, and high speed data traffic. Storage and data networking promises to provide transparent data sharing services at high speeds.

In sharing resources among many applications in storage and data networks, it is important to provide effective techniques for sharing and fairness. All queues should be effectively processed per their respective priorities, for example, to permit many network traffic flows to be individually scheduled per their respective negotiated Quality-of-Service (QoS) levels. When a system is becoming congested during the highest peak periods, it is important that critical queues are effectively processed and given higher priority than low priority queues so that critical data will be delivered to its application.

Problems arise when multiple sources send data cells or packets at widely varying rates through a switch node or link of a network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists, the buffer storage will be filled to maximum capacity so that any additional data must be discarded.

Various credit-based control approaches have been used for controlling data transmission. For example, U.S. Pat. No. 5,063,562, issued Nov. 5, 1991 to Barzilai et al., and assigned to the present assignee, discloses a method and apparatus for dynamically adjusting the window size in a session between a sender and a receiver over a link of a packet transmission network. This patent discloses a dynamic window adjustment scheme to determine the optimum window size with a minimum number of iterations. This patent also covers a method and apparatus for sharing pacing credits among a number of sessions during which packets are transmitted over the network. Sessions having no packets to transmit will send pacing credits to a shared credit pool while pacing credits will be distributed to those session having packets to transmit.

U.S. Pat. No. 5,515,359, issued May 7, 1996 to Zheng, discloses a system for controlling traffic in a digital communication network to avoid data loss due to congestion that utilizes an integrated credit-based and rate-based traffic control approach, and adjusts the rate at which data is transmitted from a source in accordance with feedback in the form of rate and credit adjustment information from a network reflecting the ability of the network to transmit data and the destination to receive data. In one embodiment, a source end system sends out resource management cells composed of various fields containing rate and credit information. The intermediate systems of the network and the destination end system update the corresponding fields according to their congestion status and send the resource management cells back to the source end system so that the source end system controls the data transmission accordingly. In a preferred embodiment, a source end system calculates an allowed cell rate from each of the fields in a resource management cell, and the minimum one among them is used to control data transmission.

U.S. Pat. No. 5,432,824, issued Jul. 11, 1995 to Zheng et al., discloses a system for controlling traffic in a digital communication network to avoid data loss due to congestion that utilizes both credit-based and rate-based traffic control approaches within a common framework, and adjusts the rate at which data is transmitted from a source in accordance with feedback in a form of credit values from a destination reflecting the ability of the network to transmit data and the destination to receive data. In one embodiment, the destination receives the information about network congestion, and, knowing its own capacity to receive more data, generates a credit in the form a numeric value which is fed back to the source so that the source adjusts its transmission rate to avoid data loss due to congestion in the network.

U.S. Pat. No. 5,528,591, issued Jun. 18, 1996 to Lauer, discloses a system for controlling traffic in a digital communication network that eliminates separate buffer queues in a credit-based traffic control system by providing switches at intermediate nodes that provide credit numbers back to the source reflecting either credit numbers from downstream nodes or the numbers of buffers allocated to virtual connections at the node, whichever is the smaller. In one embodiment, this is accomplished by dividing the buffers at a node among the number of virtual connections at that node to establish a number of buffers, each allocated to a different virtual connection, and comparing the numbers of credits received at that node with the number of buffers. Thereafter, data cells are transmitted only in accordance with that credit number such that the amount of data transmitted down the virtual channel is limited to that which can be processed at the node with the fewest or most restricted buffers, whereby data may be immediately transmitted to other nodes without loss.

U.S. Pat. No. 5,852,602, issued Dec. 22, 1998 to Sugawara, discloses a credit control method and system, where an initial credit value is sent from a receiving-side to a sending-side prior to transferring a packet. Transfer of a packet is started on the sending-side when this credit value is received. On the receiving-side, a new credit value is calculated when the packet is received, and the same number of packets as the number indicated by the calculated new credit value are received and processed. A new credit value is sent to the sending-side whenever receiving buffers whose number equals the preceding new credit value are emptied. On the sending-side, the sum of the new credit value and the initial credit value, whenever the new credit value is received, is stored as a credit value indicating the number of successively transmittable packets. The stored credit value is decremented by one on the sending-side whenever a packet is sent, and packets are continuously transferred until the credit value becomes "0" or there is no more packet to be sent. An integral new credit value $C_n$ calculated based on a condition: $Ta+Tp \times (C_n-1) < Tp \times sCi$ where Ta is a time from transmission of the initial credit value to reception of the first packet on the receiving-side, Tp is a time required to send one fixed-length packet, and Ci is the initial credit value is Ci.

U.S. Pat. No. 6,044,406, issued to Barkey et al. on Mar. 28, 2000 and assigned to the present assignee, discloses a credit-based flow control checking and correction system. A credit-based flow control checking scheme is presented for controlling data communications in a closed loop system comprising a sender, a receiver and a link coupling the sender and receiver. The credit-based scheme includes automatically periodically transmitting a credit query from the receiver to the sender and upon return receipt of a credit acknowledge containing the available credit count maintained by the sender, determining whether credit gain or credit loss has occurred subsequent to initialization of the closed loop system. Along with automatically determining whether credit gain or credit loss has occurred, a method/system is presented for automatically correcting the loss or gain without requiring resetting of the closed loop system.

SUMMARY OF THE INVENTION

A principal object of the present invention is to provide a method, apparatus and computer program product for implementing multiple credit levels generated over multiple queues for a dataflow. Other important objects of the present invention are to provide such method, apparatus and computer program product for implementing multiple credit levels generated over multiple queues for a dataflow substantially without negative effect and that overcome many of the disadvantages of prior art arrangements.

In brief, a method, apparatus and computer program product are provided for implementing multiple credit levels generated over multiple queues for a dataflow. A plurality of programmable configuration values is stored for each of the multiple queues including a queue maximum count, a queue clip count and a queue cutoff count. Buffer use and a number of outstanding credits to the dataflow for each of the multiple queues are monitored to maintain a current in use count. The current in use count is compared with a programmable global threshold count and the queue cutoff counts of the multiple queues. A number of credits are selectively generated for each of the multiple queues based upon the compared counts and the stored programmable configuration values.

In accordance with features of the invention, different values are set for the queue cutoff counts of the multiple queues to set a priority of each queue. When the current in use count is less than the programmable global threshold count, a respective first number of credits are generated based upon the queue maximum count for each of the multiple queues. When the current in use count is greater than the programmable threshold count and less than the queue cutoff count, a respective second number of credits are generated based upon the queue clip count. When the current in use count is greater than the cutoff count for a queue, zero credits are generated for the queue. The stored programmable configuration values for each of the multiple queues include a queue threshold count. A current number of outstanding credits are maintained for each of the multiple queues. The queue threshold count is compared with the current number of outstanding credits for each of the multiple queues. When the current number of outstanding credits is greater than the queue threshold count for a queue, zero credits are generated for the queue.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
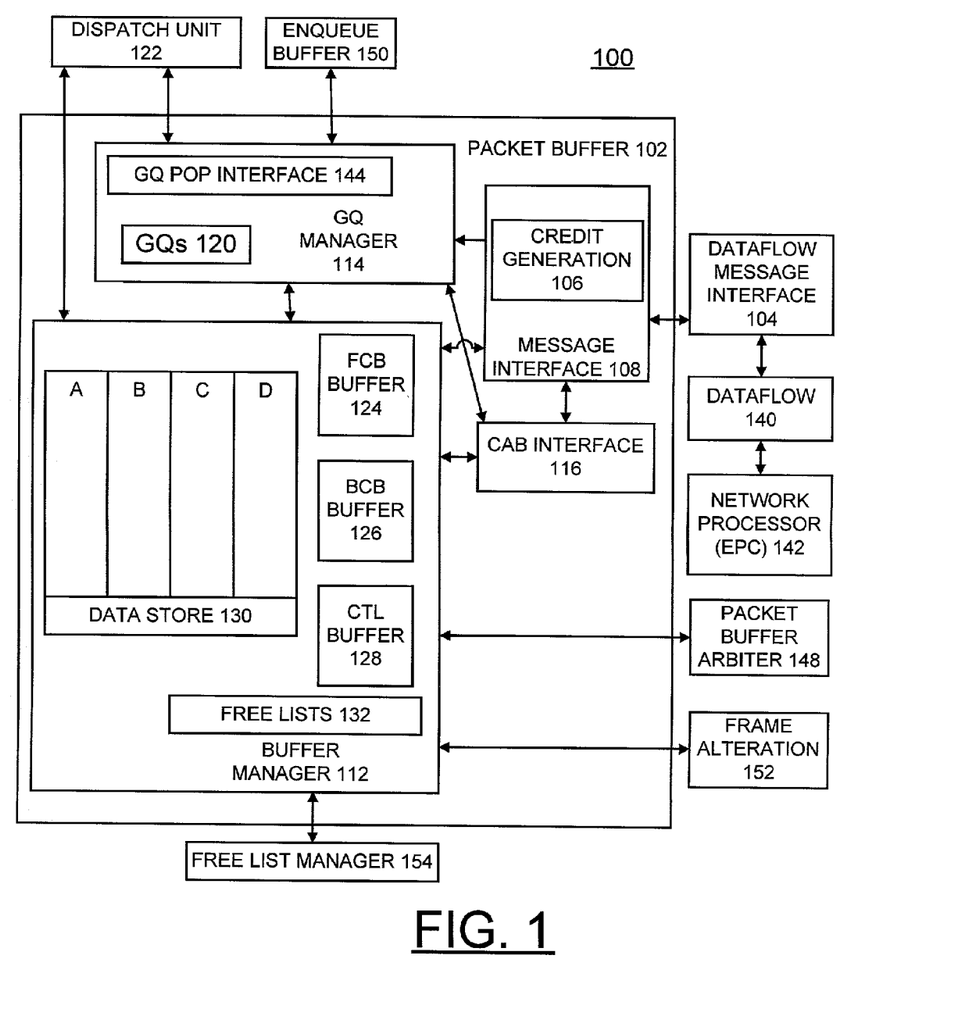
FIG. 1 is block diagram illustrating a data and storage network including a packet buffer for implementing multiple credit levels generated over multiple queues in accordance with the preferred embodiment.

Having reference now to the drawings, in FIG. 1, there is shown a data and storage network 100 including a packet buffer generally designated by the reference character 102 for implementing multiple credit levels generated over multiple queues in accordance with the preferred embodiment. The packet buffer 102 is responsible for storing and managing the packet data and control information received from a dataflow message interface (DMI) 104.

Packet buffer 102 includes a credit generation function 106 of the preferred embodiment, a message interface control 108, a free pool, a buffer manager 112, a general queue (GQ) manager 114, and a control access block (CAB) interface 116. Through the use of a plurality of GQs 120, such as twelve GQs 120, the packet buffer 102 signals a dispatch unit 122 of the new packet location. The packet buffer 102 utilizes random access memories (RAMs) for a frame control block (FCB) buffer 124, a buffer control block (BCB) memory 126, a control buffer 128, a data store 130 and a free lists 132 for storing packet data, and control information. The buffer manager 112 controls the arbitration to the SRAMs 124, 126, 128. All arbitration schemes are strict priority based. The CAB interface 116 holds all of the configuration registers, the debug MUX, and logic for initializing the SRAMs 124, 126, 128. The BCB and FCB SRAMs 126, 124 are chained together such that each entry links to the next entry for the free lists 132. The data store 130 and control SRAMs 124, 126, 128 are initialized to zeroes.

Packet buffer 102 handles the generation of dispatch.request messages and manages the associated credits. The packet buffer 102 issues credits in the form of a dispatch.request message to a dataflow 140 via the DMI 104. Each dataflow 140 (one shown) serves as a data path for transmitting and receiving dataflow traffic, for example, via a network interconnect and/or a switch fabric interface. The dataflow returns a dispatch.response or dispatchmore.response together with data for processing by a network processor or an embedded processor complex (EPC) 142. The message interface 108 aligns the dispatch.response messages to be stored in the buffer manager 112. The message interface 108 can drop the available signal to the DMI 104 if the level in the BCB and FCB pools becomes too low to guarantee that incoming data will not be lost or if many small dispatch.mores come in causing contention to the storage of data into the SRAMs. The packet buffer 102 reassembles the response messages and aligns the data into the data store buffers 130. When an entire frame is received, the packet buffer 102 signals the dispatch unit 122 via a GQ pop interface 144. The dispatch unit 122 reads the control data in the GQ pop interface 144 and then reads the first buffer of the data store data. If the pico processor needs to read more data or alter the data, it requests access to the data store 130 via the packet buffer arbiter 148. The packet buffer arbiter 148 has access to all of the memory locations inside of the packet buffer 102.

An enqueue buffer 150 can send recirculated or discarded frames back to the packet buffer 102. If the frame is recirculated, the packet buffer 102 will place the frame back onto an identified GQ 120. If the frame is discarded, the buffers associated with the frame will be freed. A frame alteration partition 152 can read and send the processed frames to the dataflow 140. When the frame alteration 152 has read the entire buffer control block data, it releases the buffer control blocks BCBs and frame control block FCB back into the free pool. A free list manager 154 can lease either BCBs or FCBs for pico-code of EPC 142 to use.

The GQ manager 114 controls all of the GQs 120 and the respective GQ pop interfaces 144 to the dispatch unit 122. When an entry reaches the head of a GQ, several specific fields of the control buffer 128 are fetched and placed on the GQ pop interface 144 along with the data that is contained in the FCB 124 and a valid signal is raised. The dispatch unit 122 asserts the taken signal after it has read the information and another FCB and control buffer will be read from the SRAM. Two sources for the GQ entries include new frames from the message interface 108 and recirculated frames from the enqueue buffer 150. If the recirculate path has a predefined GQ indicator that a frame is to be released; the GQ manager 114 passes the FCBA to the Free Pool so that all the corresponding BCBs 126 and the FCB 124 are released.

In accordance with features of the preferred embodiment, the credit generation partition 106 controls the generation of the credits for the dispatch.request messages. The generation of the credits is used for signalling the dataflow 140 to indicate that the packet buffer 102 has space available for a particular GQ 120 to prevent overflow and to provide priority for packets assigned to a particular GQ 120 by the dataflow 140. Based upon the configuration registers illustrated and described with respect to FIG. 2, the credit generation 106 generates dispatch.request messages to the dataflow message interface 104 allotting the dataflow 140 more credits. A credit generation algorithm of the preferred embodiment generates multiple credit levels to the dataflow 140 for the multiple different GQs 120 based upon a current number of available credits. All of the GQs 120 receives some credits, if configured. The number of credits that can be issued for each GQ 120 is based upon the number of credits currently in use. The number of credits currently in use is maintained as a global in use count. As the in use count increases, the number of credits that can be issued is restricted on an individual GQ basis. When the current in use count is greater than a programmable global clip count value, the number of credits that can be issued is changed for each individual GQ 120. The current in use count is compared with a respective programmable GQ cutoff count value for the multiple different GQs 120, then no credits are issued for each of the GQs 120 having a QC cutoff count value less than the current in use count.

Figure 2:
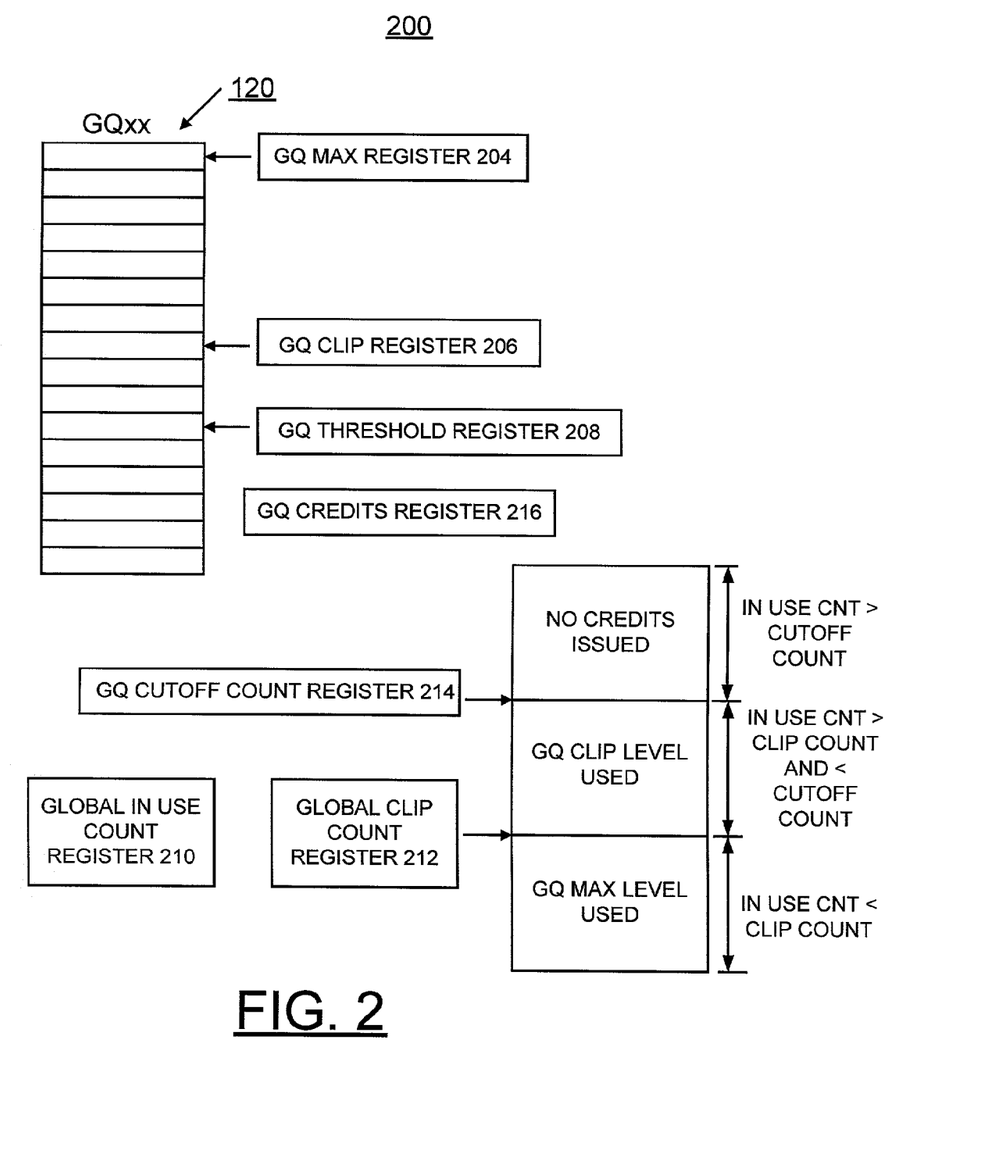
FIG. 2 is a diagram illustrating registers for implementing multiple credit levels generated over multiple queues in accordance with the preferred embodiment.

Referring now to FIG. 2, there are shown exemplary registers generally designated by the reference character 200 for implementing multiple credit levels generated over multiple queues in accordance with the preferred embodiment. One of the multiple GQs 120, labeled GQxx, is illustrated together with a plurality of exemplary GQ registers in accordance with the preferred embodiment.

A respective GQ max register 204 stores a maximum number of outstanding credits for each respective GQ 120. A respective GQ clip register 206 stores a GQ clip value that is used as the maximum number of credits that can be outstanding for each respective GQ 120 when buffer space is becoming limited. A respective GQ threshold register 208 stores a GQ threshold value for each respective GQ 120 that is used to attempt to issue more credits when the number of outstanding credits falls below this value. A global in use count register 210 stores a global in use count value equal to (total buffers filled)/2 plus total credits outstanding for all GQs 120. A global clip count register 212 stores a global clip count value that is used to issue maximum credits as specified in clip register 206 when the global in use count is greater than the global clip count value. A respective GQ cutoff count register 214 stores a GQ cutoff count value for each respective GQ 120 that is used so that no credits are issued to the GQ 120 when the global in use count is greater than the GQ cutoff count value. A respective GQ credits register 216 stores a GQ credits value equal to a number of credits outstanding to the dataflow 104 for each respective GQ 120.

In accordance with features of the preferred embodiment, the packet buffer 102 generates the dispatch.request messages to issue credits to each dataflow chip 140. After synchronization and initialization of dataflow 140 is achieved, the packet buffer 102 issues the number of credits specified in the maximum credit register 204 for each GQ 120 to the dataflow. The credits are retrieved when the dispatch.response or dispatch.more messages are processed by the packet buffer 102. The control information of the dispatch.response message specifies for which GQ 120 the message belongs. One credit is retrieved for each 128 byte frame segment that is received. If the frame or frame segment is less than 128 bytes, one credit is also retrieved. When the number of outstanding credits drops less than or equal to the value specified in the threshold register 208, the packet buffer 102 issues another dispatch.request message for that GQ 120 to resupply the dataflow 140 with one exception. This exception comes when the data store is getting full as defined by the number of buffers being used divided by two plus the number of outstanding credits. Then when the packet buffer 102 is almost full, the number of credits that can be issued for each GQ 120 is limited to the value specified in the respective GQ clip register 206. This allows the packet buffer 102 to have less outstanding credits and more room in its internal buffers for incoming packets. There is no way to take credits away from the dataflow 140, therefore the buffers needed to handle all of the outstanding credits are reserved.

In accordance with features of the preferred embodiment, the priority of the GQs 120 are configurable by setting their individual cutoff registers 214 to different values. A GQ 120 is restricted from sending any credits to the dataflow 140 when the number of buffers being used divided by two plus the number of outstanding credits is equal to or greater than the value specified in the GQ cutoff register 214. In this way, each GQ 120 is able to run freely when there are ample buffers available, but when the free buffers become limited, the GQs 120 with the lowest priority are restricted leaving only the higher priority GQs 120 to send credits to fill the remaining buffers. The advantage of using the clip level is that the number of outstanding credits is limited allowing more buffers to be used before the lower priority queues are restricted. It is the responsibility of the initialization code to ensure that the total number of outstanding credits is set properly to ensure that the low priority queues are not restricted unnecessarily. To ensure that the dataflow 140 is not waiting for credits because of the delay through the DMI 104, the maximum register for each queue should be set to a predefined queue maximum value, such as, 6 or greater.

Referring now to FIGS. 3, 4, 5, and 6, there are shown exemplary sequential steps performed by packet buffer 102 for carrying out methods for implementing multiple credit levels generated over multiple queues in accordance with the preferred embodiment.

Figure 3:
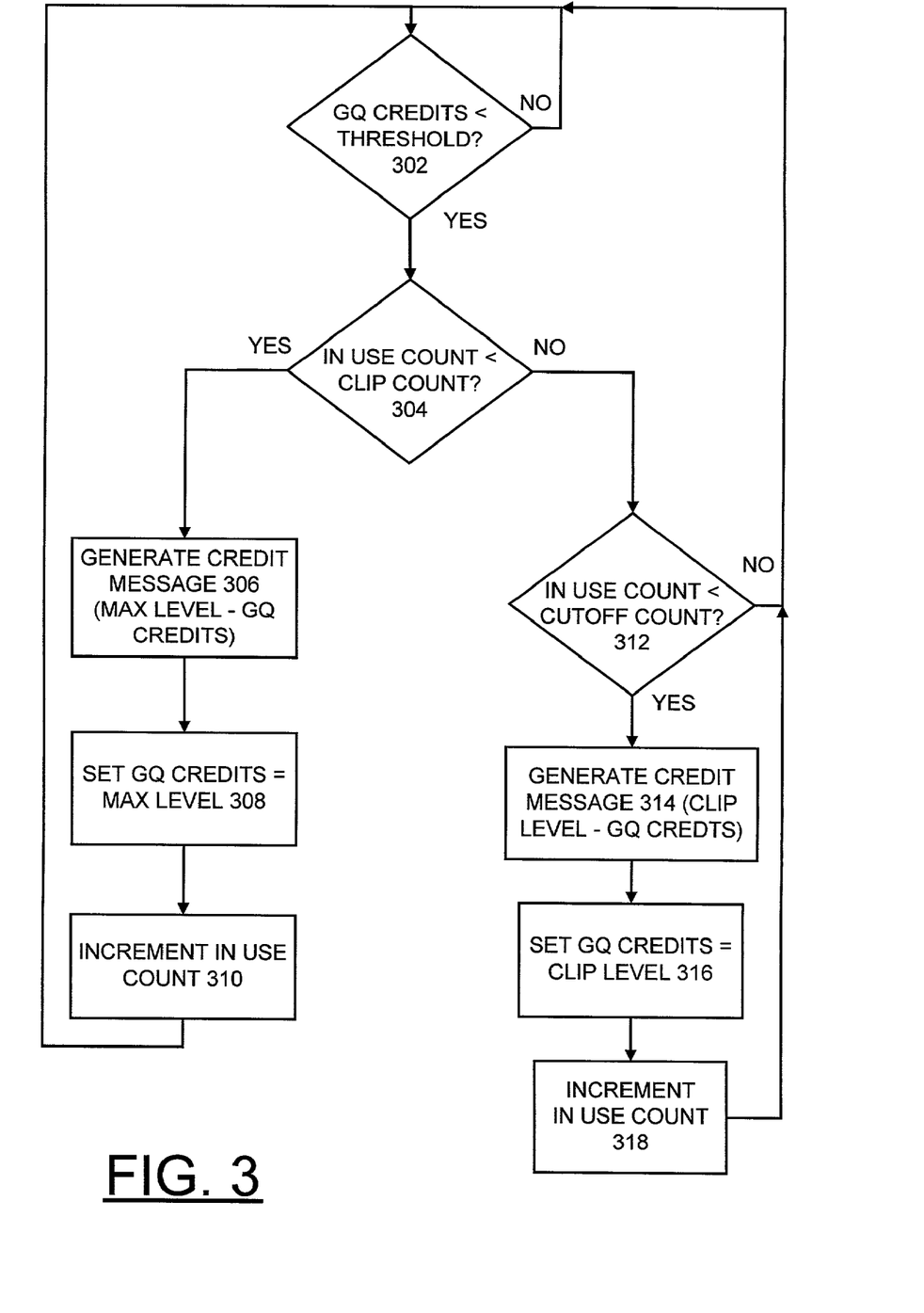
FIGS. 3, 4, 5, and 6 are flow charts illustrating exemplary sequential steps for carrying out methods for implementing multiple credit levels generated over multiple queues in accordance with the preferred embodiment.

Referring initially to FIG. 3, sequential operations begin by comparing the GQ credits with the threshold count as indicated in a decision block 302. When the GQ credits are less than the threshold count, such as at initialization with the GQ credits initially zero, then the in use count is compared to the clip count as indicated in a decision block 304. When the in use count is less than the clip count, such as at initialization, then the packet buffer 102 generates a credit message to issue credits to dataflow chip 140 for each GQ 120 equal to the GQ max level less GQ credits as indicated in a block 306. Then the GQ credits are set equal to the GQ max level as indicated in a block 308. The in use count is incremented as indicated in a block 310. Then the sequential operations return to decision block 302 for comparing the GQ credits with the threshold count. When the GQ credits are not less than the threshold count, then comparing the GQ credits with the threshold count is continued at decision block 302.

When determined at decision block 304 that the in use count is not less than the clip count, then the in use count is compared to the GQ cutoff count as indicated in a decision block 312. When the in use count is not less than the GQ cutoff count, then the sequential operations return to decision block 302 for comparing the GQ credits with the threshold count. When the in use count is less than the GQ cutoff count, then the packet buffer 102 generates a credit message to issue credits to dataflow chip 140 for each GQ 120 equal to the GQ clip level less GQ credits as indicated in a block 314. Then the GQ credits are set equal to the GQ clip level as indicated in a block 316. The in use count is incremented as indicated in a block 318. Then the sequential operations return to decision block 302 for comparing the GQ credits with the threshold count.

Figure 4:
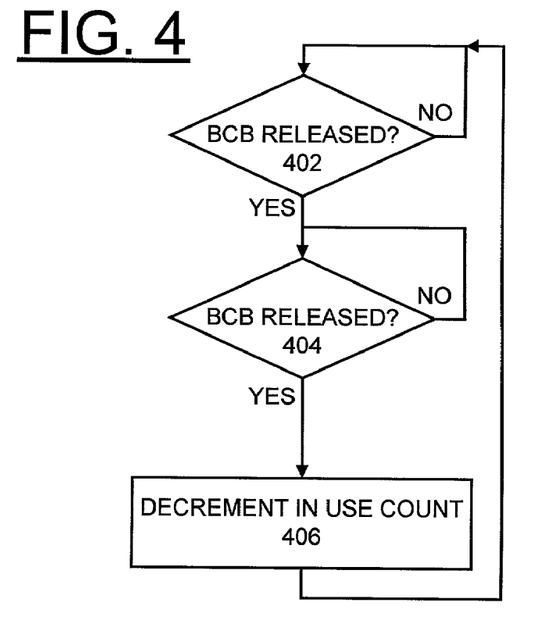
Figure 5:
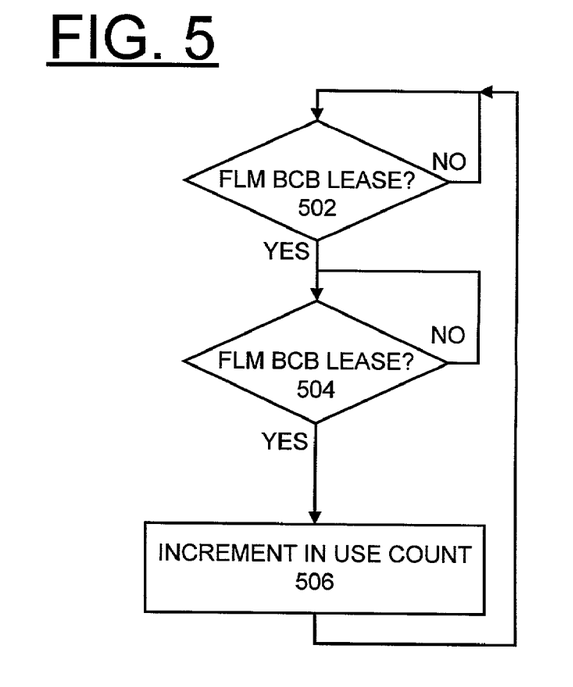

Referring now to FIGS. 4, and 5, exemplary sequential steps for maintaining the global in use count are shown. In FIG. 4, checking for a first BCB being released is performed as indicated in a decision block 402. After a first BCB is released, checking for a second BCB being released is performed as indicated in a decision block 404. When both first and second buffer control blocks are released, then the in use count is decremented as indicated in a block 406. In FIG. 5, checking for the free list manager 154 leasing a first BCB is performed as indicated in a decision block 502. After a first BCB is leased, checking for a second BCB being leased is performed as indicated in a decision block 504. When both first and second buffer control blocks are leased, then the in use count is incremented as indicated in a block 506.

Figure 6:
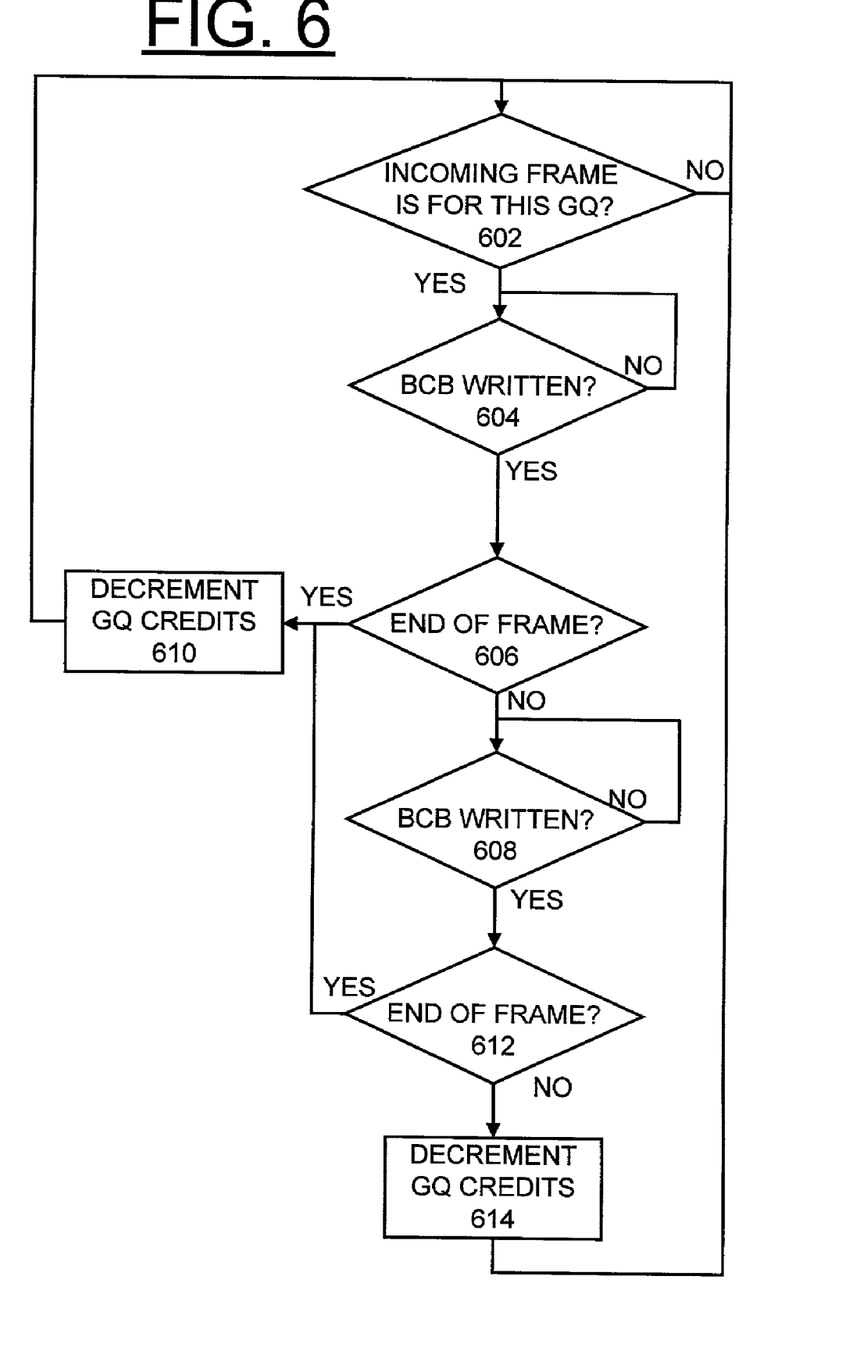

Referring now to FIG. 6, exemplary sequential steps for maintaining the GQ credits are shown. Checking whether an incoming frame is for this GQ is performed as indicated in a decision block 602. When the incoming frame is not for this GQ, then checking continues for a next one of the GQ 120 at decision block 602. When the incoming frame is for this GQ, then checking whether a BCB is written is performed as indicated in a decision block 604. When a BCB is written, then checking for an end of frame is performed as indicated in a decision block 606. When an end of frame is identified, then the GQ credits value is decremented as indicated in a block 608. Then the sequential operations return to decision block 602. When an end of frame is not identified, then checking whether a second BCB is written is performed as indicated in a decision block 610. When a second BCB is written, then checking for an end of frame is performed as indicated in a decision block 612. When an end of frame is identified, then the GQ credits is decremented at block 608 and the sequential operations return to decision block 602. When an end of frame is not identified, then the GQ credits value is decremented after two BCBs are written as indicated in a block 614. Then the sequential operations return to decision block 602.

Figure 7:
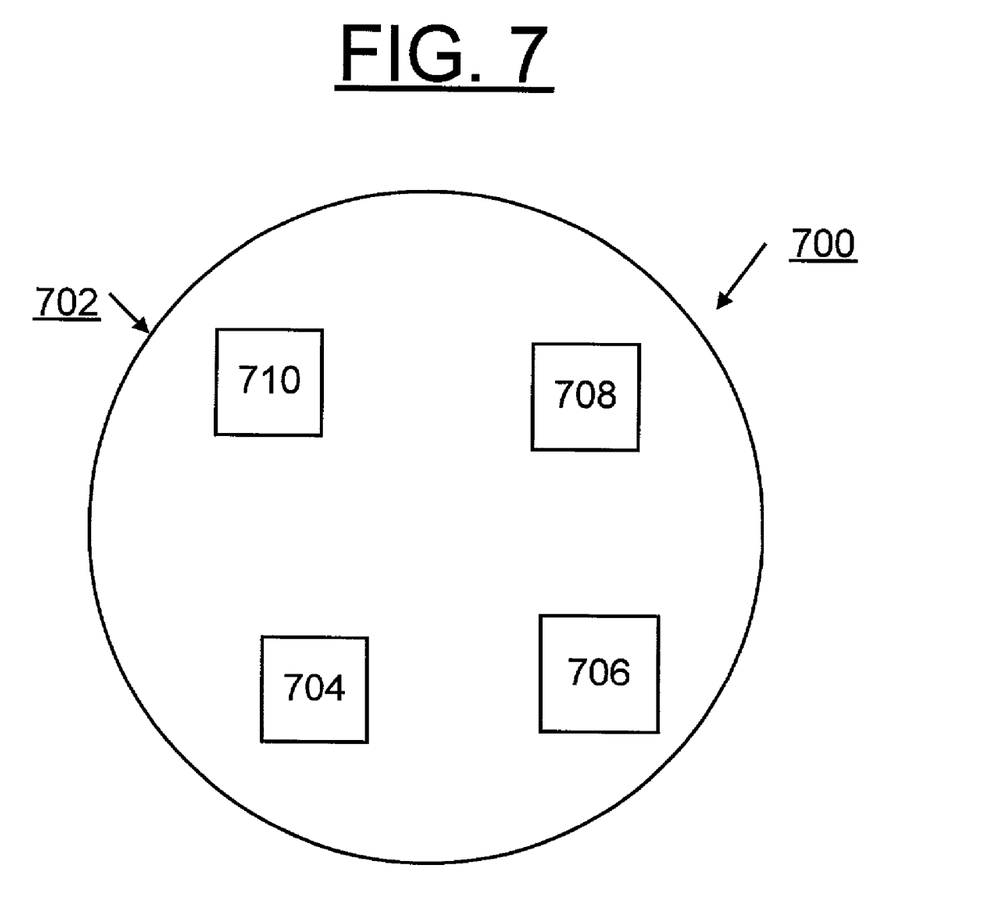
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing multiple credit levels generated over multiple queues of the preferred embodiment in the packet buffer 102 of FIG. 1.

A sequence of program instructions or a logical assembly of one or more interrelated modules defined by the recorded program means 704, 706, 708, 710, direct the credit generation 106 of packet buffer 102 for implementing multiple credit levels generated over multiple queues of the preferred embodiment.

While the present invention has been described with reference to the details of the embodiments of the invention shown in the drawing, these details are not intended to limit the scope of the invention as claimed in the appended claims.

What is claimed is:

1. A method for implementing multiple credit levels generated over multiple queues for a dataflow comprising the steps of:

storing a plurality of programmable configuration values for each of the multiple queues; said programmable configuration values for each of the multiple queues including a queue maximum count, a queue clip count, and a queue cutoff count;

monitoring buffer use and a number of outstanding credits to the dataflow for each of the multiple queues to maintain a current in use count;

comparing said current in use count with a programmable global threshold count and said queue cutoff counts for the multiple queues; and selectively generating a number of credits for each of the multiple queues based upon comparing said current in use count with said programmable global threshold count and said queue cutoff counts for the multiple queues and based upon said programmable configuration values for each of the multiple queues.

2. A method for implementing multiple credit levels generated over multiple queues as recited in claim 1 includes the step of providing a plurality of configuration registers for each of the multiple queues for storing said plurality of configuration values for each of the multiple queues.

3. A method for implementing multiple credit levels generated over multiple queues as recited in claim 1 wherein said plurality of programmable configuration values for each of the multiple queues includes a queue threshold value; and further the steps of comparing said queue threshold value with said outstanding credits to the dataflow for each of the multiple queues.

4. A method for implementing multiple credit levels generated over multiple queues as recited in claim 3 wherein the step of selectively generating a number of credits for each of the multiple queues based upon comparing said current in use count with said programmable global threshold count and said queue cutoff counts for the multiple queues and based upon said programmable configuration values for each of the multiple queues further includes the steps responsive to a current number of outstanding credits being greater than a queue threshold count for a queue of the multiple queues, generating zero credits for said queue.

5. A method for implementing multiple credit levels generated over multiple queues as recited in claim 1 wherein the step of selectively generating said number of credits for each of the multiple queues based upon comparing said current in use count with said programmable global threshold count and said queue cutoff counts for the multiple queues and based upon said programmable configuration values for each of the multiple queues includes the steps responsive to said current in use count being less than said programmable global threshold count, of generating a respective first number of credits based upon said queue maximum count for each of the multiple queues.

6. A method for implementing multiple credit levels generated over multiple queues as recited in claim 1 wherein the step of selectively generating said number of credits for each of the multiple queues based upon comparing said current in use count with said programmable global threshold count and said queue cutoff counts for the multiple queues and based upon said programmable configuration values for each of the multiple queues includes the steps responsive to said current in use count being greater than said programmable threshold count and less than said queue cutoff count, generating a respective second number of credits based upon said programmable configuration values for each of the multiple queues.

7. A method for implementing multiple credit levels generated over multiple queues as recited in claim 1 wherein the step of selectively generating said number of credits for each of the multiple queues based upon comparing said current in use count with said programmable global threshold count and said queue cutoff counts for the multiple queues and based upon said programmable configuration values for each of the multiple queues includes the steps responsive to said current in use count being greater than said queue cutoff count for a queue, generating zero credits for said queue.

8. A computer program product for implementing multiple credit levels generated over multiple queues for a dataflow with a packet buffer, said computer program product including a plurality of computer executable instructions stored on a computer readable medium, wherein said instructions, when executed by said packet buffer, cause said packet buffer to perform the steps of:

storing a plurality of programmable configuration values for each of the multiple queues; said programmable configuration values for each of the multiple queues including a queue maximum count, a queue clip count and a queue cutoff count;

monitoring buffer use and a number of outstanding credits to the dataflow for each of the multiple queues to maintain a current in use count;

comparing said current in use count with a programmable global threshold count and said queue cutoff counts for the multiple queues; and selectively generating a number of credits for each of the multiple queues based upon comparing said current in use count with said programmable global threshold count and said queue cutoff counts for the multiple queues and based upon said programmable configuration values for each of the multiple queues.

9. A computer program product for implementing multiple credit levels generated over multiple queues as recited in claim 8 wherein said plurality of programmable configuration values for each of the multiple queues includes a queue threshold value; and further the steps of comparing said queue threshold value with said outstanding credits to the dataflow for each of the multiple queues; and wherein the step of selectively generating a number of credits for each of the multiple queues based upon comparing said current in use count with said programmable global threshold count and said queue cutoff counts for the multiple queues and based upon said programmable configuration values for each of the multiple queues further includes the steps responsive to a current number of outstanding credits being greater than said a queue threshold count for a queue of the multiple queues, generating zero credits for said queue.

10. A computer program product for implementing multiple credit levels generated over multiple queues as recited in claim 8 wherein the step of selectively generating said number of credits for each of the multiple queues based upon comparing said current in use count with said programmable global threshold count and said queue cutoff counts for the multiple queues and based upon said programmable configuration values for each of the multiple queues includes the steps responsive to said current in use count being less than said programmable global threshold count, of generating a respective first number of credits based upon said queue maximum count for each of the multiple queues.

11. A computer program product for implementing multiple credit levels generated over multiple queues as recited in claim 8 wherein the step of selectively generating said number of credits for each of the multiple queues based upon comparing said current in use count with said programmable global threshold count and said queue cutoff counts for the multiple queues and based upon said programmable configuration values for each of the multiple queues includes the steps responsive to said current in use count being greater than said programmable threshold count and less than said queue cutoff count, of generating a respective second number of credits based upon said programmable configuration values for each of the multiple queues.

12. A computer program product for implementing multiple credit levels generated over multiple queues as recited in claim 8 wherein the step of selectively generating said number of credits for each of the multiple queues based upon comparing said current in use count with said programmable global threshold count and said queue cutoff counts for the multiple queues and based upon said programmable configuration values for each of the multiple queues includes the steps responsive to said current in use count being greater than said queue cutoff count for a queue, of generating zero credits for said queue.

13. Apparatus for implementing multiple credit levels generated over multiple queues for a dataflow comprising:

a plurality of configuration registers for storing a plurality of configuration values for each of the multiple queues; said programmable configuration values for each of the multiple queues including a queue maximum count, a queue clip count, a queue threshold count, and a queue cutoff count;

a plurality of queue credits registers for storing a current number of outstanding credits to the dataflow for each of the multiple queues;

a global in use count register for storing a current in use count of in use buffers and a global number of outstanding credits to the dataflow for the multiple queues;

a global threshold count register for storing a programmable global threshold count; and a credit generation function for comparing said current in use count with said programmable global threshold count and said queue cutoff counts for the multiple queues and for selectively generating a number of credits for each of the multiple queues based upon comparing said current in use count with said programmable global threshold count and said queue cutoff counts for the multiple queues and based upon programmable configuration values for each of the multiple queues.

14. Apparatus for implementing multiple credit levels generated over multiple queues as recited in claim 13 wherein said credit generation function further compares said queue threshold count with said outstanding credits to the dataflow for each of the multiple queues; and responsive to said current number of outstanding credits being greater than said queue threshold count for a queue of the multiple queues, for generating zero credits for said queue.

15. Apparatus for implementing multiple credit levels generated over multiple queues as recited in claim 13 wherein said credit generation function is responsive to said current in use count being less than said programmable global threshold count, for generating a respective first number of credits based upon said queue maximum count for each of the multiple queues.

16. Apparatus for implementing multiple credit levels generated over multiple queues as recited in claim 13 wherein said credit generation function is responsive to said current in use count being greater than said programmable threshold count and less than said queue cutoff count, for generating a respective second number of credits based upon said queue clip count for each of the multiple queues.

17. Apparatus for implementing multiple credit levels generated over multiple queues as recited in claim 13 wherein said credit generation function is responsive to said current in use count being greater than said queue cutoff count for a queue, for generating zero credits for said queue.

* * * * *